Nov. 25, 1958 W. A. ANDERSON 2,861,746
CONTROL MEANS FOR ACCOUNTING MACHINE
Filed Dec. 28, 1955 3 Sheets-Sheet 3
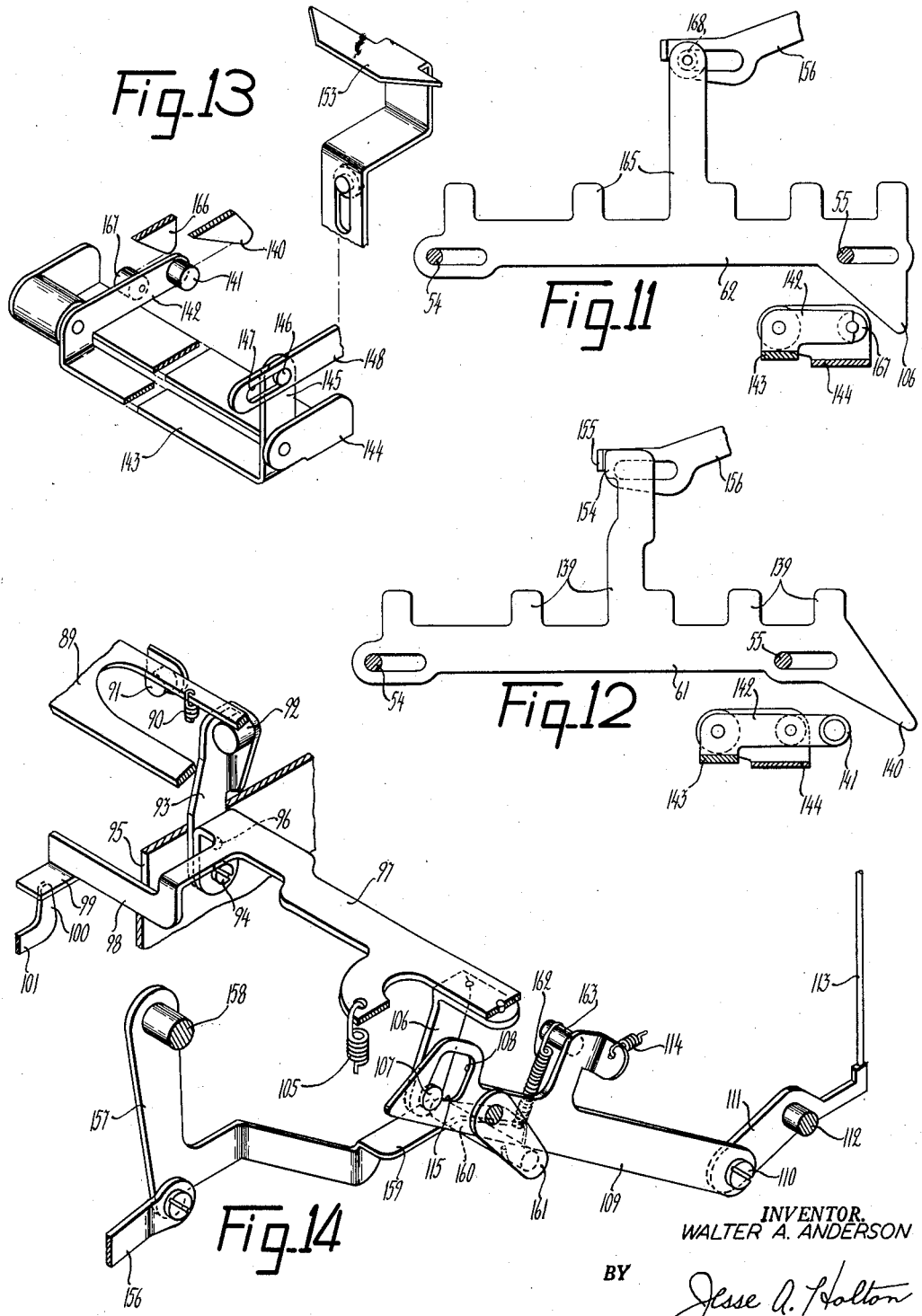
INVENTOR.
WALTER A. ANDERSON
BY
Jesse A. Holton
ATTORNEY United States Patent Office 2,861,746
Patented Nov. 25, 1958

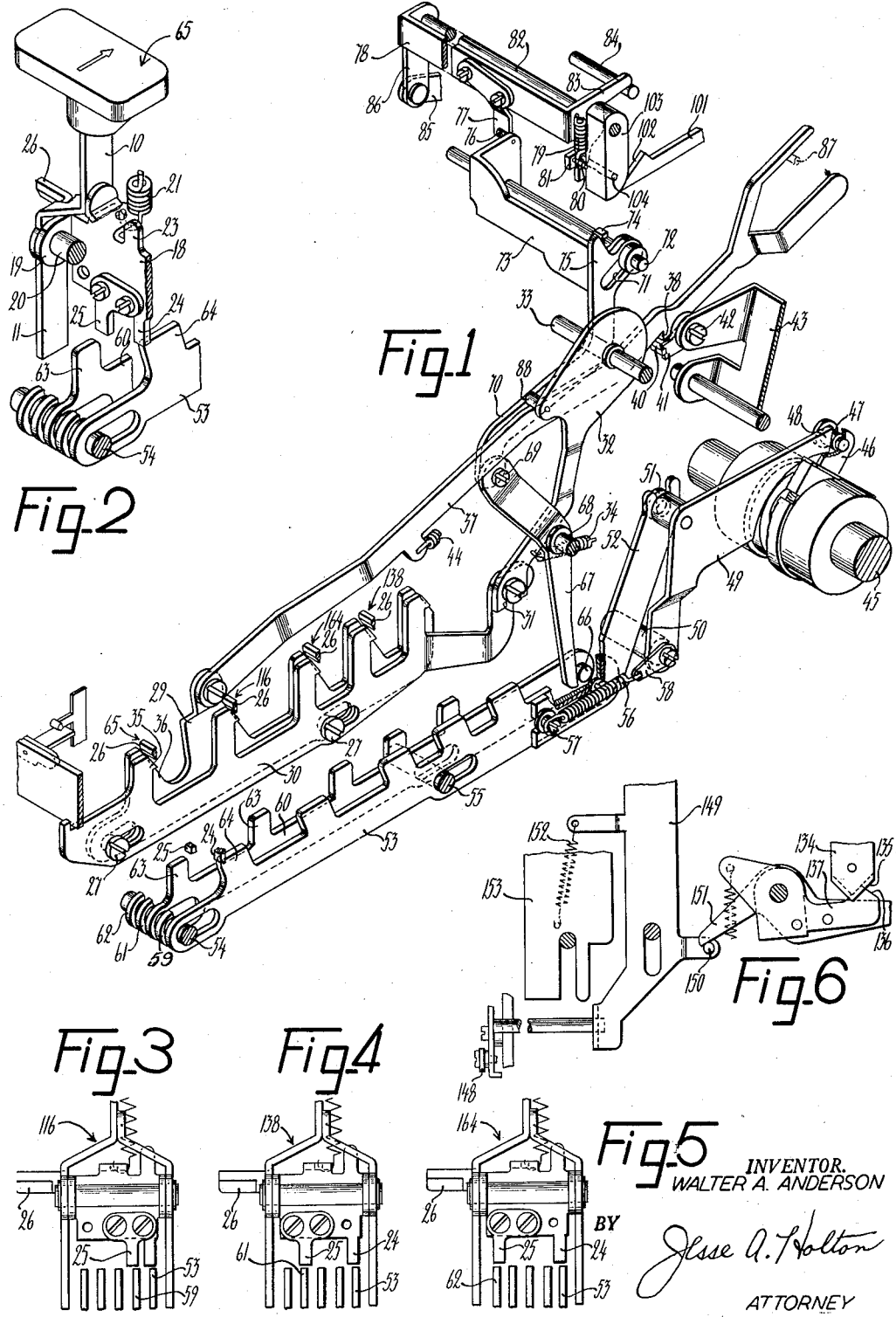

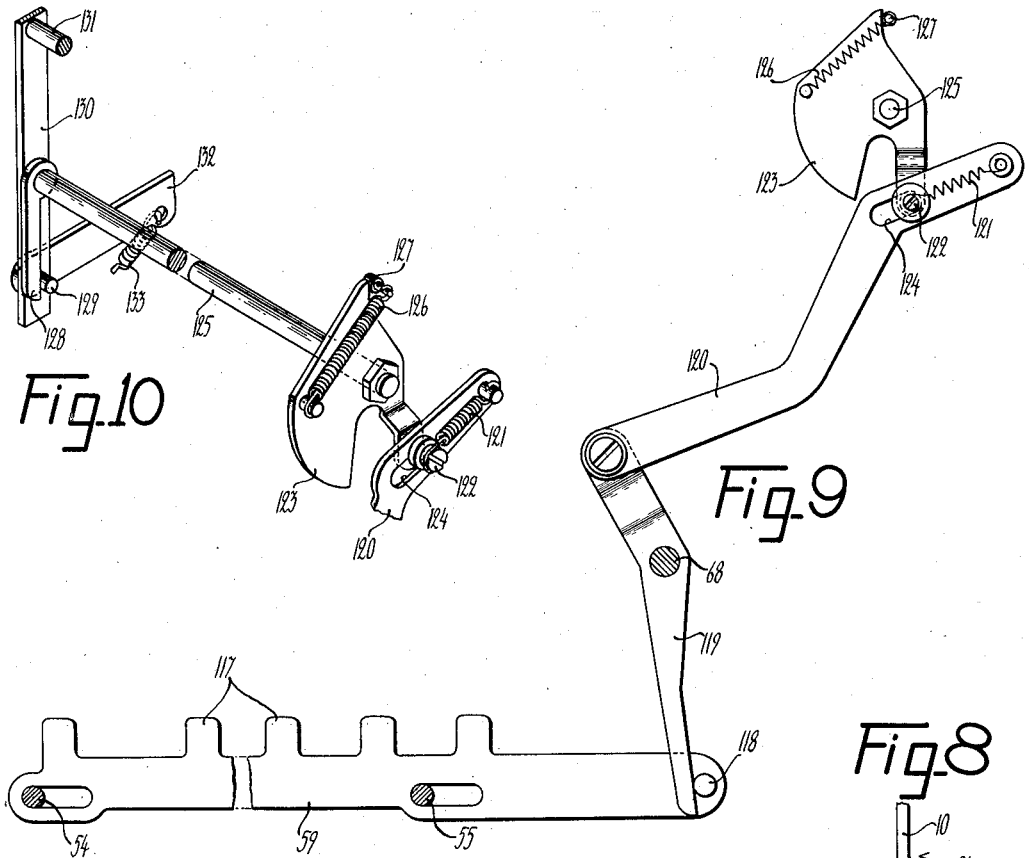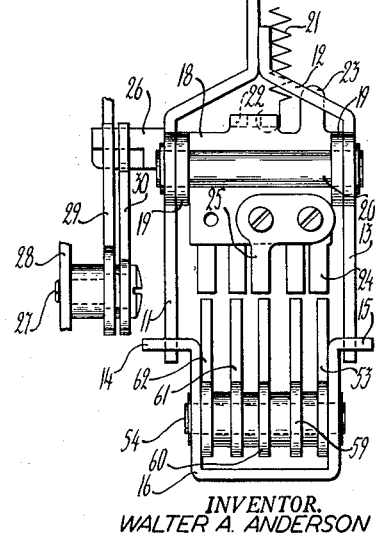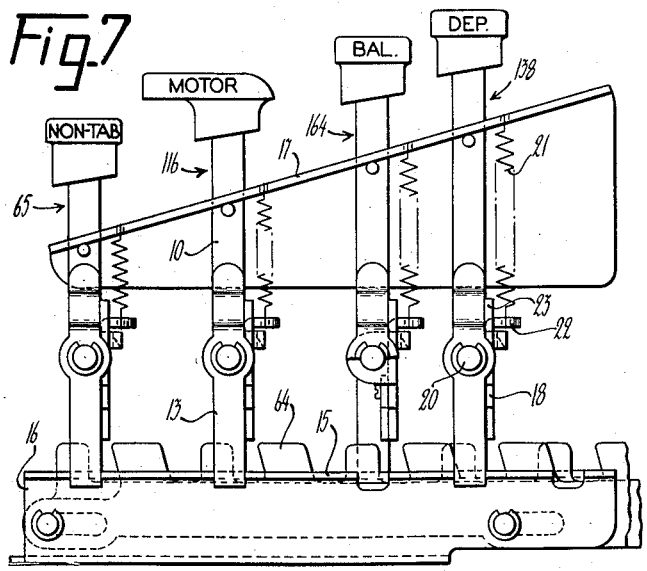

2,861,746

CONTROL MEANS FOR ACCOUNTING MACHINE

Walter A. Anderson, Trumbull, Conn., assignor to Underwood Corporation, New York, N. Y., a corporation of Delaware Application December 28, 1955, Serial No. 555,952

6 Claims. (Cl. 235—62)

The present invention relates to accounting machines and more particularly to means for controlling the functions of such machines.

Accounting machines generally include a carriage adapted to hold a work sheet, such as an accounting form, and movable back and forth across a printing station to align the various columns of the work sheet with said printing station. It is quite common to have certain machine functions determined automatically in accordance with the columnar position of the carriage but these automatically determined functions may be varied by operation of function keys provided on the keyboard. Likewise the carriage movement is often determined automatically in accordance with a preselected schedule but this schedule may be varied at will by the operation of carriage control keys which keys may also properly be referred to as function keys, since they determine the movement or function of the carriage. The linkages or trains of mechanisms operated by the function keys have required different amounts of force to operate, depending upon the particular function to be performed, with the undesirable result that varying degrees of pressure have been required to operate the different function keys.

It is an object of the present invention to provide an accounting machine having a plurality of function keys all of which may be operated with the same light pressure.

It is another object of the invention to provide an arrangement whereby the locations of the different function keys of an accounting machine may conveniently and inexpensively be interchanged to suit the particular desires of the person who is to operate the machine or to place the most often needed keys in the most convenient locations in accordance with the type of work to be performed.

A still further object of the present invention is to provide an arrangement whereby the various function keys of an accounting machine may readily be altered so that operation of a given key may institute different machine operations or functions.

These and other objects, features and advantages will become readily apparent as the description of a preferred embodiment of the invention proceeds.

Referring now to the drawings:

Figure 1 is a perspective view showing some of the mechanisms of the present invention including the means for instituting a machine cycle and a portion of the mechanism involved in a "Non-Tab" operation, Figure 2 is a perspective view of one of the function keys and shows the manner in which said key operatively interconnects a power operated member and a function controlling member, Figures 3, 4 and 5 are respectively elevational views of the lower portions of a "Motor Bar" key, a "Deposit" key and a "Balance" key and showing the relationship between said keys and certain control slides, Figure 6 is a partial rear elevational view showing certain previously known elements whose operation is effected by both the "Balance" and "Deposit" keys, Figure 7 is a side elevational view showing the manner in which the function keys are mounted, Figure 8 is a front elevational view showing in detail the relationship between the function keys and the elements directly associated therewith, Figure 9 is a side elevational view of a portion of the mechanism for effecting a shuttle or short return of the carriage, Figure 10 is a perspective view of a portion of the shuttle mechanism, Figure 11 is a side elevational view of a portion of the mechanism employed in controlling the movement of the carriage to position for printing a balance, Figure 12 is a view similar to Figure 11 but showing mechanism for effecting movement of the carriage to the "Deposit" column, Figure 13 is a diagrammatic perspective view showing mechanism whose operation is effected by both the "Balance" and "Deposit" keys, and Figure 14 is a perspective view of a portion of the mechanism for conditioning the machine for a "Non-Tab" operation.

The invention has been incorporated in the well-known Sundstrand Accounting Machine, the conventional features of which are described in the patent to Sundstrand No. 2,194,270, and said patent will be referred to from time to time in this specification for certain details which, while related to the mechanisms of the present invention, are not in themselves novel.

Since the function keys themselves are of an unique construction which contributes substantially to the efficacy of the whole arrangement, reference is made first to Figures 2, 7 and 8 showing said construction and the manner in which the keys are mounted. Each key comprises a member offset intermediate its length to provide an upwardly directed portion 10 to which is connected a cap which may bear an indication of the function instituted by that particular key and a downwardly directed leg 11. A member 12 is riveted or otherwise secured to the upwardly directed portion 10 and has a downwardly directed leg 13 extending parallel to the leg 11. The lower portions of the legs 11 and 13 are respectively slidably guided in notches provided in outwardly directed flanges 14 and 15 of a stationarily mounted channel member 16. The upwardly directed portions 10 of the keys are guided in slots provided in a keyboard cover plate 17.

A rocker plate 18 has a pair of ears 19 by means of which it is mounted upon a rod 20 carried by and extending between the legs 11 and 13. A spring 21, extending between a tab 22 on rocker plate 18 and the keyboard cover plate 17 urges said rocker plate in a counterclockwise direction as viewed in Figures 2 and 7, a tab 23 on said rocker plate engaging the member 12 to limit the counterclockwise movement. The spring 21 is also effective to hold the key in its normal raised position.

For reasons presently to appear, each of the rocker plates 18 has a downward extension 24 formed integrally therewith and is adapted to have secured thereto in selective locations an element 25 providing a downward extension running parallel to the extension 24. Each of the key legs 11 is provided with a cycle tripping and key latching arm 26 extending outwardly from the upper portion thereof. To facilitate the following of the description, the individual function keys will presently be given separate general reference numerals but it will be apparent that they differ from one another primarily in the placement and location of the elements 25, which elements may be simple stampings and are readily securable selectively to any of the rocker plates 18.

Referring now to Figures 1 and 8, a pair of studs 27 secured in a portion 28 of the framework of the machine slidably carry a cycle trip slide 29 and a key lock slide 30. The key lock slide 30 is connected by a pin-and-slot connection 31 to an arm of a member 32 rockably mounted upon a shaft 33. A spring 34 extending between the member 32 and the framework tends to rock said member in a counterclockwise direction to thereby draw the slide 30 rearwardly. The key lock slide is provided with the usual beveled surfaces 35 which lie in the path of movement of the studs 26 of the several function keys. Upon depression of a function key, the stud 26 momentarily cams the slide 30 slightly toward the left and when the key becomes fully depressed the stud 26 is latched beneath the beveled surface 35 and the key is thereby held down until the slide 30 is again moved toward the left, in a manner presently to be explained.

The cycle trip slide 29 has sloping surfaces 36 lying beneath each of the studs 26 of the function keys so that upon depression of any key said slide is moved to the left as viewed in Figure 1. A link 37 is pivotally connected at its forward end to the slide 29 and near its rearward end is provided with a shoulder 38 normally engaged with a pin 40 provided upon a forwardly extending link partially shown at 41. The link 41 corresponds to the link 589 of the above referred to Sundstrand Patent No. 2,194,270 and is pivotally supported at its rear end at 42 by a bail member 43. A spring 44 urges the link 37 and the cycle trip slide 29 rearwardly to the position shown in the drawing. When the slide 29 is moved forward upon operation of one of the function keys, the shoulder 38 pulls the link 41 forward to thereby cause engagement of a one-revolution clutch, not shown, in the manner explained in the said Sundstrand patent. As also explained in the Sundstrand patent, engagement of the one-revolution clutch causes the machine to perform a cycle of operations which involves a rocking movement of the main cycle shaft 45 approximately 90° in a counterclockwise direction during the first half of the cycle followed by restoration of said shaft during the second half cycle. The shaft 45 corresponds to the shaft 17 of the Sundstrand patent.

Secured to the shaft 45 is an arm 46 carrying a pin 47 which is engaged with a nose 48 provided upon a member 49 pivotally mounted upon a stub shaft 50. The member 49 is connected by a pin-and-slot connection 51 to an arm 52 secured to a power slide 53. The slide 53 is mounted upon a pair of stationary shafts 54 and 55 and is urged rearwardly by a spring 56 extending between a pin 57 on said slide and an anchor member 58 hooked to the stub shaft 50. Thus, upon operation of the main cycle shaft 45, the member 49 is rocked counterclockwise about the shaft 50 and the power slide 53 is moved forward.

Slidably mounted upon the shafts 54 and 55 adjacent the power slide 53 are a plurality of function instituting slides 59, 60, 61 and 62. The slides 59, 61 and 62 are only partially shown in Figure 1 and they will be referred to in detail later in the specification. The slide 60 shown in Figure 1 is provided with a plurality of upwardly projecting arms 63 which are slightly offset longitudinally from arms 64 provided upon the power slide 53. The slide 60 controls the function of Non-Tabulating. The Non-Tab key generally designated 65 is shown in Figure 2 and it will be observed that upon depression of said key the downward extension 24 of the rocker plate 18 will be projected into the path of movement of one of the arms 64 of the power slide 53 and the element 25 will be aligned with one of the arms 63 of the slide 60. As the main cycling shaft 45 moves counterclockwise during the early part of the cycle the arm 64 of the power slide 53 contacts the extension 24 and swings the rocker plate 18 of the Non-Tab key 65 in a clockwise direction thereby causing the element 25 to engage the arm 63 of slide 60 and move said slide toward the left as viewed in Figures 1 and 2.

The slide 60 is provided at its rearward end with a pin 66 which is in engagement with one arm of a lever 67. The lever 67 is pivoted upon a shaft 68 and the upper arm of said lever is pivotally connected at 69 to one end of a link 70, the other end of which is provided with a slot 71 through which extends a shaft 72. A bail member 73 is rockably mounted upon the shaft 72 and has a tab 74 which rests against a nose 75 of the link 70. There is a pin 76 on bail 73 and a tab 77 carried by a bail 78 is urged into engagement with said pin by a spring 79 which extends between a portion of the framework and a pin 80 carried by an arm 81 of bail 78. The bail 78 is rockably mounted upon a shaft 82 and an arm 83 of said bail bears against a stop pin 84 to limit the clockwise rocking movement thereof. The spring 79 urges bail 73, link 70, lever 67 and slide 60 to the positions shown in Figure 1.

A link 85 is pivotally connected to an arm 86 of the bail 78 and upon counterclockwise movement of said bail said link is moved rearwardly to disable the carriage escapement mechanism. The link 85 corresponds to link 704 of the above referred to Sundstrand patent and manner in which its movement disables the escapement mechanism to cause the carriage to remain in the same columnar position is explained in said patent.

Thus it will be seen, that after setting up an amount on the keyboard in the usual manner, if the Non-Tab key 65 is depressed the slide 29 is drawn to the left to institute a machine cycle to print the amount as usual and, early in the cycle, the power slide 53 will be moved leftward causing the rocker plate 18 of the key 65 to swing clockwise and pick up the slide 60. As the slide 60 moves, the pin 66 thereon swings the lever 67 clockwise thereby causing the nose 75 of link 70 to rock the bail 73 clockwise. As the bail 73 rocks clockwise, the pin 76, due to its engagement with the tab 77, rocks the bail 78 in a counterclockwise direction to thereby move the link 85 rearwardly and prevent a tabulating movement of the carriage. The Non-Tab key 65 is therefore the function key which is used when it is desired to list figures in a vertical column. It will be observed that the only work performed by the operator in depressing the key is to institute a machine cycle.

The rear end of link 37 overlies a pin 87, corresponding to pin 595 of the above referred to Sundstrand patent, and, as explained in said patent, the pin 87 moves upward near the end of the cycle to raise the rear end of link 37 and disengage the shoulder 38 from the pin 40 thereby preventing a second cycle from being instituted should the key be held down. A pin 88 on member 32 overlies the link 37 and as the rear of said link is raised, its upper edge contacts the pin 88 and swings the member 32 clockwise thereby moving the lock slide 30 toward the left to release the key and permit its restoration by the spring 21.

When the Non-Tab key 65 is operated to enable amounts to be listed in a vertical column, it is of course necessary to line-space the platen after each amount is printed and for a brief description of that operation, reference is now made to Figures 1 and 14 and to the patent to Anderson No. 2,536,524. In Figure 14 a portion of a line-spacing blade 89 has been indicated. The blade 89 corresponds to blade 345 of the Anderson patent and is rockably mounted upon the carriage of the machine. A spring 90 tends to rock blade 89 but a pin 91 normally underlies said blade and prevents its rocking movement. As explained in the Anderson patent, the pin 91, which corresponds to pin 351 of said patent, is removed from blocking engagement with the blade during every machine cycle but since line-spacing is ordinarily undesirable when the carriage moves in tabulating direction, other means are employed to prevent rocking of the blade 89 and the consequent line-spacing operation.

According to the present invention, the "other means"

referred to above comprises a pin 92 carried by an arm 93 pivotally mounted by means of a screw 94 on a portion 95 of the machine framework. Also pivoted upon the screw 94 and secured to the arm 93, as by means of a rivet 96, is a member 97. The member 97 is also pivotally supported at its other end, not shown, so that it is rockable about its two pivot points to remove the pin 92 from blocking alignment with the blade 89. An arm 98 of the member 97 is provided with a tab portion 99 which rests upon an end 100 of a pivotally mounted lever 101.

The forward end of lever 101, shown in Figure 1, is provided with a cam surface 102 aligned with an arm 103 pivoted upon the shaft 82. A pin 104 extends out from the side of arm 103 and lies in the path of counter-clockwise movement of the arm 81 of the bail 78. As the bail 78 is rocked counterclockwise to condition the machine for a non-tab operation as previously explained, the bail arm 81 rocks arm 103 and as arm 103 engages the cam surface 102 the forward end of lever 101 is lowered and the end 100 thereof is raised. In Figure 14 it is apparent that raising of the end 100 of lever 101 rocks the member 97 to remove the pin 92 from beneath the line-space blade 89. Thus, when the Non-Tab key 65 is operated, the machine is conditioned so that the platen is line-spaced after the amount is printed and the carriage remains stationary so that the next amount will be printed in the same vertical column of the worksheet. A spring 105 connected to the member 97 serves to restore the pin 92 to blocking position upon release of the Non-Tab key.

Not only is it desirable to line-space the platen and the worksheet carried thereby when amounts are to be listed in a single vertical column but it is also desirable to line-space whenever the carriage is moved from left to right, i. e. in carriage return direction. To this end, as shown in Figure 14, the member 97 has connected thereto an arm 106 carrying a pin 107. The pin 107 extends into an opening 108 provided in a member 109 which member is pivotally connected at 110 to a lever 111 rockably mounted upon a shaft 112. A rod 113 rests upon one end of lever 111 and extends upwardly into position to be operated by carriage carried control means when said carriage is in certain columnar positions. A spring 114 urges the member 109 to a position wherein the pin 107 is located behind a shoulder 115 in the opening 108, as shown in drawing, so that upon depression of rod 113 the member 109 is effective to rock the member 97 and remove pin 92 from beneath the blade 89 to thereby permit said blade to execute its line-spacing rocking movement.

The present invention has been illustrated in connection with a machine for making out bank statements and such work will ordinarily require only infrequent use of the Non-Tab key. Bank statement work normally requires the printing of a patron's old balance in the first or left-hand column of a form followed by a listing of the checks or withdrawals in a plurality of columns; after which the deposits are listed in a separate column and finally the new balance is printed in the right-hand column. The normal program of operation of the machine is that after setting up the old balance on the keyboard, the operator depresses the Motor Bar whereupon the old balance is printed and the carriage moves to the first check column. The amount of the first check is then set up on the keyboard and the Motor Bar is depressed whereupon the amount of the check is printed and the carriage moves to the second check column. After the operator sets up the amount of the check to be printed in the last or right-hand check column, the Motor Bar is again depressed and this time after the amount is printed, the carriage returns to the first check column, a line-spacing operation being executed at that time. During the continued listing of checks the carriage shuttles back and forth across the check columns.

After the operator has set up on the keyboard the amount of the last check, the Deposit key is operated to cause the carriage to tabulate to the deposit column, if there are any deposits to be listed, or the Balance key is operated to cause the carriage to tabulate directly from the check column to the balance column. The above described operations are not new but the present invention provides new mechanisms for facilitating these operations.

The Motor Bar has been generally designated 116 and it is located on the keyboard in alignment with the Non-Tab key 65. In Figure 3 it may be observed that the element 25 of the key 116 is aligned with the previously referred to function control slide 59. The slide 59 is similar to the slide 60 and, as shown in Figure 9, has upstanding arms 117 similar to the arms 63 of slide 60. Upon depression of the key 116, a machine cycle is instituted in the same manner as previously described in connection with Non-Tab key 65. As the power slide 53 moves toward the left, it rocks the rocker plate 18 of key 116 and the element 25 of said key picks up the slide 59 and moves it toward the left as viewed in the drawings.

Referring now to Figures 9 and 10, the slide 59 is provided with a pin 118 located behind the lower arm of a lever 119 pivotally mounted upon the shaft 68. The upper arm of lever 119 is pivotally connected to one end of a link 120 the other end of which is yieldingly connected by a spring 121 to a pin 122 of a member 123. The pin 122 extends through an elongated opening 124 of the link 120 to guide the movement of said link. The member 123 is secured to a rockshaft 125 and a spring 126 urges said member against a stop pin 127 as shown in the drawing. Also secured to the rockshaft 125 is an arm 128 the free end of which rests against a pin 129 secured in an arm 130 pivoted upon a shaft 131. The pin 129 extends through the arm 130 and serves to pivotally connect the forward end of a link 132 to said arm. The link 132 corresponds to the link 536 of the patent to Anderson, No. 2,630,900 and, as explained in said patent, when said link is moved rearwardly the machine is conditioned for an intermediate carriage return or as it is sometimes referred to, a shuttle operation. A spring 133 connected to the link 132 tends to restore said link to normal position.

The rear end of link 132 is connected to a sliding structure a portion of which is indicated in Figure 6 at 134. The operation of said sliding structure is fully explained in the Anderson Patent No. 2,630,900 and it is sufficient for the disclosure of the present invention to note that normally an edge 135 of said structure rests against an edge of a latch tooth 136 and that in Figure 6 said structure is shown in "shuttle" position wherein the edge 135 lies against the side of tooth 136. The latch tooth 136 is part of a latch member 137 the operation of which will presently be explained.

With the mechanism above described, it will be apparent that when the Motor Bar 116 is operated, the slide 59 will be moved to the left under the power of the cycling mechanism to thereby, through the lever 119, link 120 and spring 121, rock the member 123 in a counterclockwise direction. Rocking of member 123 of course results in the arm 128 pushing rearwardly on the link 132 and conditions the machine for "shuttle." Therefore, as explained in the Anderson Patent No. 2,630,900 and as mentioned above, when the Motor Bar 116 is operated after setting up the amount of a check in the last check column, the carriage returns automatically to the first check column.

After the final check to be posted to an account is set up on the keyboard, the operator does not depress the Motor Bar 116 but instead depresses either the Deposit key or the Balance key depending upon whether a deposit is to be listed.

Assuming first that a deposit item is to be entered, the operator depresses the Deposit key, which has been generally indicated by reference numeral 138. In Figure 4, it is apparent that the element 25 of the key 138 is aligned with the previously referred to slide 61 and that upon operation of said key the element 25 will lie in front of one of the upstanding arms 139, Figure 12, of said slide. Thus, upon operation of the Deposit key, the stud 26 of said key institutes a machine cycle, as previously explained, and as the power slide 53 moves forward, the rocker plate 18 of the Deposit key is rocked to thereby move the slide 61 toward the left as view in the drawing.

Referring now to Figures 12 and 13, the slide 61 is provided with a downwardly sloping tail portion 140 adapted to cooperate, when said slide is operated, with a roller 141 provided upon an arm 142 of a bail structure 143. The bail structure is rockably mounted upon a bracket 144 and a second arm 145 thereof is provided with a pin 146 extending into a slot 147 provided in the forward end of a rearwardly extending link 148. The link 148 corresponds to the link 57 of the patent to Sundstrand, et al., No. 2,308,216 and, as explained in said patent, said link is operatively connected at its rearward end to a latch slide 149, see Figure 6, so that as the link 148 is moved rearward the slide 149 is raised.

The slide 149 is provided with a pin 150 underlying a tail 151 of the latch member 137 and upon operation of said slide the latch member 137 is rocked, thereby permitting the slidable structure 134 to return to its normal position wherein a "shuttle" or intermediate carriage return will not be instituted.

A spring 152 connects the slide 149 to a control cam slide 153, Figures 6 and 13, corresponding to the slide 44 of the patent to Sundstrand, et al. Operation of the Deposit key 138 is effective, through the above described mechanisms to raise the cam slide 153 to a position wherein it will retract the column stops for all columns to the left of the deposit column to thereby, as explained in the patent to Sundstrand, et al. effect an express tabulation of the carriage from the column wherein the Deposit key is operated to the column for entering deposit items.

In order to prevent an undesired line-spacing operation during movement of the carriage to the deposit column, the slide 61 is operatively connected to the carriage controlled line-space member 109 so as to disable the line-space mechanism. To this end, the center arm 139 of the slide 61 is extended upwardly and provided with a nose 154 adapted to cooperate with a tab 155 provided upon the forward end of a link 156. As shown in Figure 14, the rear end of link 156 is pivotally connected to a lever 157 pivotally mounted upon a shaft 158. The lever 157 is provided with an arm 159 which overlies a pin 160 secured to an arm 161 pivotally mounted upon the member 109. A spring 162 extends between the pin 160 and a pin 163 secured to the member 109 to yieldingly hold the pin 160 against the bottom edge of said member. Upon operation of the slide 61, the nose 154 contacts the tab 155 and draws link 156 forward thereby rocking the lever 157 in a clockwise direction. As the lever 157 rocks, the arm 159 thereof moves the free end of member 109 down to remove the shoulder 115 from the pin 107. With the pin 107 located in the upper portion of the opening 108, the member 109 is ineffective to operate the member 97 to permit a line-spacing operation, as previously explained.

Should there be no deposits to post to the account, the operator, after setting up on the keyboard the amount of the last check, depresses a Balance key rather than the Deposit key. The Balance key has been generally designated 164 and in Figure 5 it is seen that the element 25 of said key is aligned with the hereinbefore mentioned slide 62. As shown in Figure 11, the slide 62 is provided with arms 165 and upon operation of the Balance key the element 25 thereof lies in front of one of these arms so that, upon the movement of power slide 53 as previously explained, to rock the rocker plate 18 of the Deposit key, the element 25 moves the slide 62. A downwardly sloping tail 166 is provided upon the slide 62 and as said slide moves to the left, said tail contacts a roller 167 provided upon the previously mentioned bail arm 142. The roller 167 is located closer to the pivot of the bail 143 than is the roller 141 so that the slide 62 rocks said bail through a greater angle than does the slide 61. The movement of bail 143 through this greater angle results in moving the cam slide 153 higher, as will readily be understood. As explained in the above mentioned Patent No. 2,308,216, the raising of slide 153 to the higher elevation causes the carriage to tabulate through all columns to the left of the balance column, including the deposit column.

The center arm 165 of the slide 62 is extended upwardly and connected by a pin-and-slot connection 168 to the aforementioned link 156. Thus, upon operation of the slide 62, the link 156 is drawn forward to disable the line spacing mechanism as previously explained.

It is to be observed that the above described mechanisms make for great flexibility in the arrangement of the various function control keys. Thus, while the Non-Tab key is shown on the left in Figure 7, that is, at the bottom of the keyboard, it could just as well be interchanged with any one of the other function keys. Should it be desired for example to interchange the locations of the Non-Tab key and the Deposit key, all that is necessary is to interchange the two key tops and relocate the two elements 25 so that element 25 of the new Non-Tab key will cooperate with the slide 60 and the element 25 of the new Deposit key will cooperate with the slide 61. The slides 59, 60, 61 and 62 all have a plurality of arms adapted to be engaged by an element 25 of the function key corresponding to the particular slide so that the locations of the keys lengthwise of the slides may be changed as desired.

It will also be noted that the same amount of pressure is required for operation of all the keys since the only work directly performed by the key is to operate the cycle trip slide 29 and the key lock slide 30.

Having thus described a preferred embodiment of the invention, what is claimed is:

1. Function control means for an accounting machine comprising, a plurality of selectively operable keys, means operable by each of said keys for instituting a machine cycle, power driven means operable during a machine cycle, function control elements associated with each key, and a swingable element on each of said keys for operatively connecting said power driven means to one of said function control elements.

2. In an accounting machine; cycling mechanism, a power slide operable by said cycling mechanism, a function determining slide extending parallel to said power slide, a function control key comprising a rockably mounted element having a first portion adapted to be projected into the path of movement of said power slide and a second portion adapted to cooperate with said function determining slide, and means operable by said key for instituting operation of said cycling mechanism, said power slide engaging the first portion of said rockably mounted element during operation of the cycling mechanism to rock said element and said second portion of said element engaging and moving said function determining slide during the rocking movement of said element.

3. In an accounting machine; cycling mechanism, a power slide operable by said cycling mechanism, a plurality of function determining slides extending parallel to said power slide, a plurality of function selecting keys, each of said keys comprising a rockably mounted element having a first means adapted to be projected into the path of movement of said power slide and a second means adapted to cooperate with one of said function determining slides, and means operable by each of said keys to institute operation of said cycling mechanism, said power slide engaging the first means of the operated key during operation of the cycling mechanism to rock the rockably mounted element of said key whereby the second means of said key will operate the function determining slide associated therewith.

4. In an accounting machine; cycling mechanism, a power slide operable by said cycling mechanism, a plurality of function determining slides extending parallel to said power slide, a function selecting key, said key comprising a rockably mounted member having a portion adapted to be projected into the path of movement of said power slide, an element secured to said rockably mounted member in one of a plurality of selectable positions for cooperating with a desired one of said function determining slides, and means operable by said key to institute operation of said cycling mechanism, said power slide engaging said portion of said rockably mounted member during operating of said cycling mechanism to rock said member whereby the element secured to said member will operate the desired one of said function determining slides.

5. For use in an accounting machine; a key comprising a cap adapted to be provided with a marking indicative of the function of said key, a pair of parallel spaced apart legs adapted to slidably guide said key in a portion of an accounting machine frame, a plate-like member rockably mounted between said legs, said member having a portion extending outwardly from an edge thereof and parallel to said legs, an element secured to said member in one of a plurality of selectable positions, said element being spaced from the aforesaid portion of said member and extending parallel thereto, and a tab on said member adapted to cooperate with a non-rocking portion of said key to limit the rocking movement of said member in one direction.

6. In an accounting machine; cycling mechanism, a plurality of selectively operable function determining keys, means operable by each key to initiate operation of the cycling mechanism, a coupling means secured to each of said keys in one of a plurality of selected positions, an element power operated by said cycling mechanism, and a plurality of trains of function controlling devices, each of said keys when operated coupling one of said trains to said power operated element whereby the power for operating the train of function controlling devices is provided by the cycling mechanism.

References Cited in the file of this patent

UNITED STATES PATENTS

| | | |
|---|---|---|
| 2,044,119 | Lasker | June 16, 1936 |
| 2,117,620 | Mathi | May 17, 1938 |
| 2,500,346 | Christian | Mar. 14, 1950 |
| 2,539,948 | Ellerbeck | Jan. 30, 1951 |
| 2,650,761 | Machado | Sept. 1, 1953 |
| 2,698,715 | Spurlino | Jan. 4, 1955 |